United States Patent
O'Coin et al.

(10) Patent No.: US 10,322,364 B2
(45) Date of Patent: Jun. 18, 2019

(54) THERMALLY CONDUCTIVE STRUCTURE FOR MULTI-DIRECTION FLOW THROUGH PACKED BED

(71) Applicant: Hamilton Sundstrand Corporation, Charlotte, NC (US)

(72) Inventors: James R. O'Coin, Somers, CT (US); William G Papale, Jr., Simsbury, CT (US)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 315 days.

(21) Appl. No.: 15/347,889

(22) Filed: Nov. 10, 2016

(65) Prior Publication Data
US 2018/0126322 A1 May 10, 2018

(51) Int. Cl.
*B01D 53/02* (2006.01)
*B01D 53/04* (2006.01)
*F28F 3/02* (2006.01)
*F28F 3/08* (2006.01)
*F28F 9/00* (2006.01)
(Continued)

(52) U.S. Cl.
CPC .......... *B01D 53/0438* (2013.01); *A62B 11/00* (2013.01); *B01D 53/0415* (2013.01); *B01D 53/0446* (2013.01); *F28F 3/027* (2013.01); *F28F 3/08* (2013.01); *F28F 9/002* (2013.01); *F28F 21/084* (2013.01); *B01D 2253/108* (2013.01); *B01D 2253/1124* (2013.01); *B01D 2253/20* (2013.01); *B01D 2257/504* (2013.01); *B01D 2257/80* (2013.01); *B01D 2258/06* (2013.01); *B01D 2259/40083* (2013.01); *B01D 2259/40098* (2013.01); *B01D 2259/4575* (2013.01); *B01D 2259/65* (2013.01); *Y02C 10/08* (2013.01)

(58) Field of Classification Search
CPC .............. A62B 11/00; B01D 2253/108; B01D 2253/1124; B01D 2253/20; B01D 2257/504; B01D 2257/80; B01D 2258/06; B01D 2259/40083; B01D 2259/40098; B01D 2259/4575; B01D 2259/65; B01D 53/0415; B01D 53/0438; B01D 53/0446; F28F 21/084; F28F 3/027; F28F 3/08; F28F 9/002; Y02C 10/08
See application file for complete search history.

(56) References Cited

U.S. PATENT DOCUMENTS 4,046,529 A 9/1977 Fletcher et al.
7,637,988 B2 12/2009 Dean, II
(Continued)

FOREIGN PATENT DOCUMENTS

JP 2007040592 A * 2/2007

OTHER PUBLICATIONS

Translation of JP 2007040592-A, Feb. 2007, Okamoto, Fumitoshi.*
European Patent Office, European Search Report dated Apr. 16, 2018 in Application No. 17200867.4-1104.

Primary Examiner — Christopher P Jones
(74) Attorney, Agent, or Firm — Snell & Wilmer, L.L.P.

(57) ABSTRACT

A packed bed for a heat exchanger may comprise a frame and a first fin layer disposed within the frame. A second fin layer may be disposed within the frame. A first perforated sheet may be disposed between the first fin layer and the second fin layer. A sorbent material may be disposed within a volume of at least one of the first fin layer or the second fin layer.

6 Claims, 7 Drawing Sheets

(51) Int. Cl.
*F28F 21/08* (2006.01)
*A62B 11/00* (2006.01)

(56) References Cited

U.S. PATENT DOCUMENTS

| | | |
|---|---|---|
| 2004/0079367 A1 | 4/2004 | Goldblatt |
| 2008/0233019 A1 | 9/2008 | Dean, II |
| 2013/0228306 A1 | 9/2013 | O'Coin |
| 2016/0033081 A1 | 2/2016 | Coleman et al. |
| 2016/0074803 A1 | 3/2016 | Gebald et al. |
| 2016/0131400 A1 | 5/2016 | Cogswell |

* cited by examiner

THERMALLY CONDUCTIVE STRUCTURE FOR MULTI-DIRECTION FLOW THROUGH PACKED BED

FIELD

The present disclosure relates to heat exchangers and, more specifically, to a packed bed for a heat exchanger assembly.

BACKGROUND

Sorbent heat exchangers may be employed in various applications including, but not limited to, air purifying systems for manned spacecraft and submarines. Such systems may remove carbon dioxide ($CO_2$) from recirculated air so that the air can be re-used for onboard personnel. Systems for removing carbon dioxide from the air include may use an open cell foam filled with a $CO_2$ adsorbent material. Size, weight, and manufacturing complexity and cost may be factors considered in the design of sorbent heat exchanger systems.

SUMMARY

A packed bed for a heat exchanger and carbon dioxide removal system is described herein, in accordance with various embodiments. A packed bed for a heat exchanger may comprise a frame and a first fin layer disposed within the frame. A second fin layer may be disposed within the frame. A first perforated sheet may be disposed between the first fin layer and the second fin layer. A sorbent material may be disposed within a volume defined by at least one of the first fin layer or the second fin layer.

In various embodiments, the first fin layer may be thermally coupled to the second fin layer. The packed bed may further comprise a third fin layer disposed within the frame. A second perforated sheet may be disposed between the second fin layer and the third fin layer. The first fin layer, the second fin layer and the first perforated sheet may comprise aluminum. The sorbent material may be configured to adsorb carbon dioxide. The first fin layer may comprise first lanced offset fins and the second fin layer comprise second lanced offset fins. The first lanced offset fins may be staggered with the second lanced offset fins. The first perforated sheet may be brazed to the first fin layer and to the second fin layer.

A heat exchanger assembly is also provided. A heat exchanger assembly may comprise a first packed bed having a first fin layer and a first sorbent material disposed within the first packed bed. A second packed bed may be in thermal communication with the first packed bed. The second packed bed may have a second fin layer and a second sorbent material disposed within the second packed bed.

In various embodiments, the first packed bed may comprise a perforated sheet brazed with the first fin layer. The first fin layer may comprise lanced offset fins. The first fin layer, the second fin layer and the perforated sheet may comprise aluminum. The first sorbent material and the second sorbent material may be configured to adsorb and desorb carbon dioxide. Heat generated exothermically by adsorption of carbon dioxide by the first sorbent material may be transferred to the second packed bed. The second packed bed may receive heat from the first packed bed. The heat exchanger assembly may be substantially isothermal.

A method of manufacturing a packed bed for a heat exchanger is also provided. The method may comprise the steps of forming a first fin layer configured to fit within a frame, forming a second fin layer configured to fit within the frame, disposing a perforated sheet between the first fin layer and the second fin layer, brazing the first fin layer, perforated sheet, and second fin layer to form the packed bed, disposing the packed bed within the frame, and applying a sorbent material within the packed bed.

In various embodiments, the first fin layer may comprise first lanced offset fins and the second fin layer may comprise second lanced offset fins, may further comprise staggering the first lanced offset fins with the second lanced offset fins. The method may further comprise sealing the packed bed within the frame. The frame may define a fill port. The step of applying the sorbent material may further include injecting the sorbent material into the frame through the fill port. The method may further comprise stacking a plurality of packed bed with adjacent packed beds in thermal communication to form the heat exchanger. The sorbent material may be configured to adsorb carbon dioxide.

The foregoing features and elements may be combined in various combinations without exclusivity, unless expressly indicated otherwise. These features and elements as well as the operation thereof will become more apparent in light of the following description and the accompanying drawings. It should be understood, however, the following description and drawings are intended to be exemplary in nature and non-limiting.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the figures, wherein like numerals denote like elements.

DETAILED DESCRIPTION

Figure 1A:
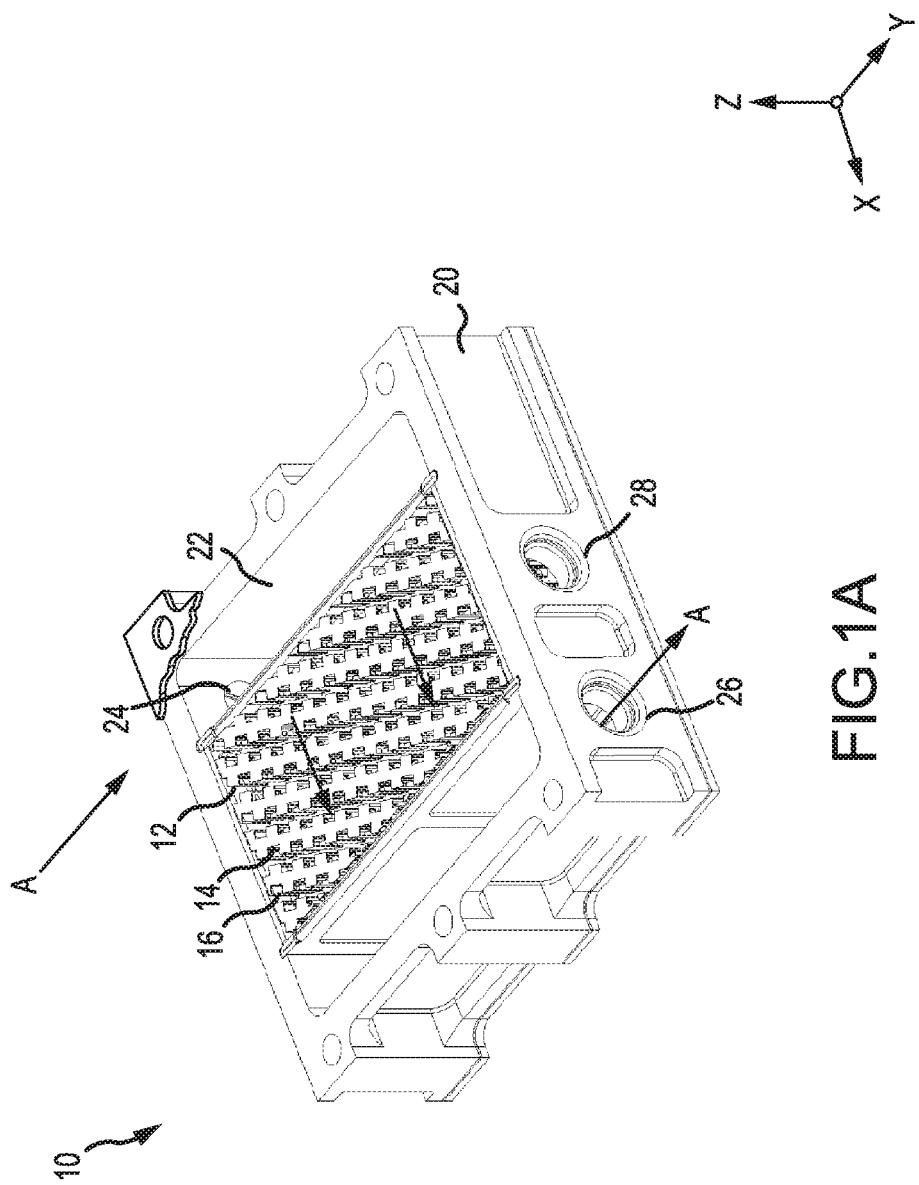
FIGS. 1A and 1B illustrate a perspective view and an exploded view of an exemplary packed bed for heat exchanger, in accordance with various embodiments.

All ranges and ratio limits disclosed herein may be combined. It is to be understood that unless specifically stated otherwise, references to "a," "an," and/or "the" may include one or more than one and that reference to an item in the singular may also include the item in the plural.

The detailed description of various embodiments herein makes reference to the accompanying drawings, which show various embodiments by way of illustration. While these various embodiments are described in sufficient detail to enable those skilled in the art to practice the disclosure, it should be understood that other embodiments may be realized and that logical, chemical, and mechanical changes may be made without departing from the spirit and scope of the disclosure. Thus, the detailed description herein is presented for purposes of illustration only and not of limitation. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected, or the like may include permanent, removable, temporary, partial, full, and/or any other possible attachment option. Additionally, any reference to without contact (or similar phrases) may also include reduced contact or minimal contact. Cross hatching lines may be used throughout the figures to denote different parts but not necessarily to denote the same or different materials.

The present disclosure relates to a packed bed for a heat exchanger, which may be used in a system for removing water and carbon dioxide from an airflow. A heat exchanger for a closed, habitable environment may include a plurality of packed beds, each containing a sorbent material to form a sorbent bed. The packed beds may be configured to facilitate airflow within the packed beds and to adsorb and desorb carbon dioxide ($CO_2$) from the airflow. Further, the packed beds may be configured to transfer heat between adjacent packed beds. Each alternating packed bed in the heat exchanger may regenerate while the adjacent packed bed adsorbs $CO_2$. For example, referring to two adjacent packed beds in a heat exchanger, a first packed bed may operate to filter an airflow by adsorbing $CO_2$, while a second packed bed may regenerate by desorbing $CO_2$. Because the adsorption process is exothermic and the desorption process is endothermic, a temperature gradient is established between the two beds that allows for energy transfer between the packed beds. As the first packed bed generates heat during the adsorption process, the heat is transferred to the second packed bed. The second packed bed is exposed to a vacuum and uses the heat and vacuum to desorb and release $CO_2$. In various embodiments, the closed environment is a spacecraft and the vacuum is a space vacuum.

Figure 1B:
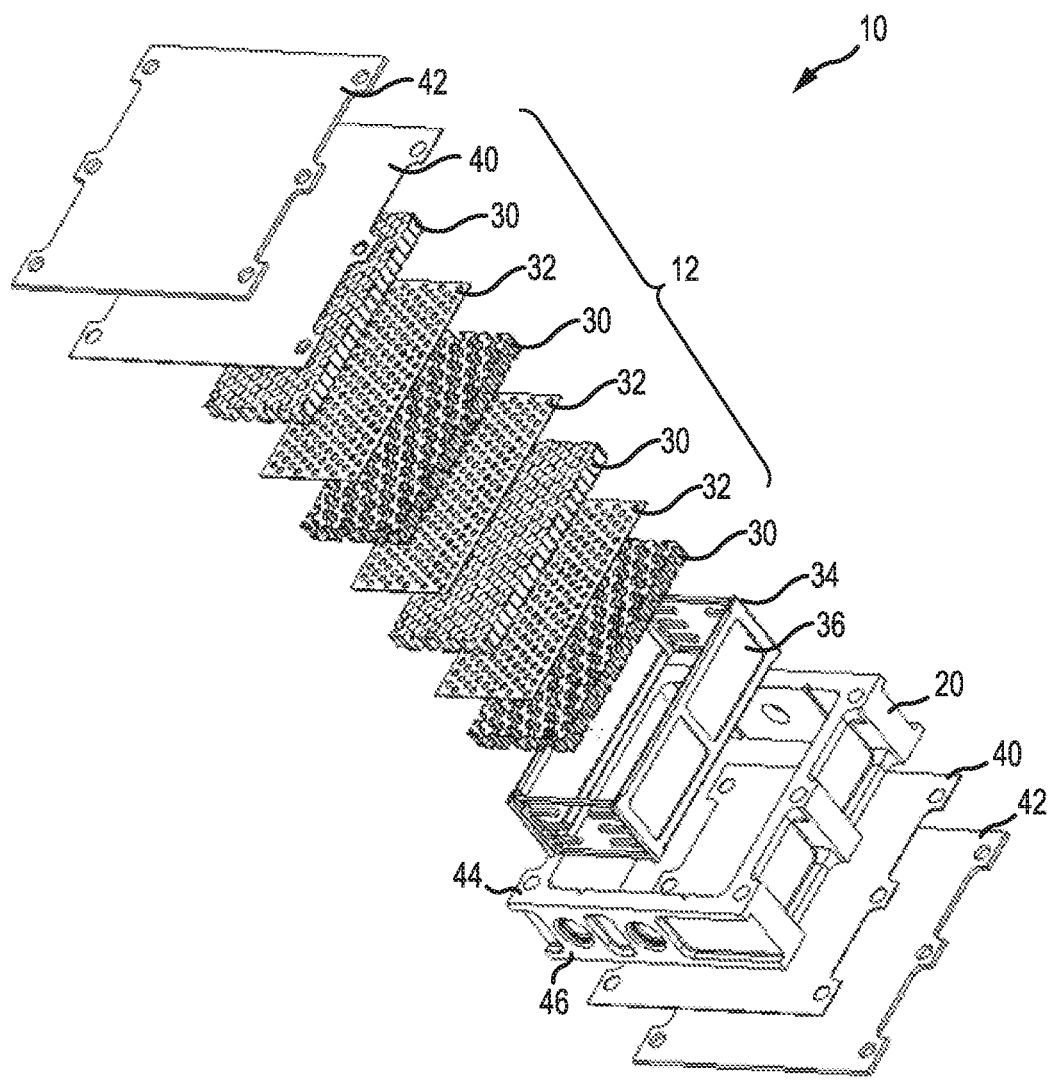

With reference to FIGS. 1A and 1B, a packed bed assembly for a heat exchanger is shown, in accordance with various embodiments. Packed bed assembly 10 includes a packed bed 12 disposed within a frame 20. Packed bed 12 may include one or more heat exchange elements 14, such as fins, and a sorbent material 16. The frame 20 may define a volumetric body or chamber 22 into which packed bed 12 may be placed. Frame 20 may define one or more openings, such as a first port 24, a second port 26, and a fill port 28. First port 24 and second port 26 may permit gas to enter the chamber 22. Packed bed 12 may be disposed within chamber 22 of frame 20 between first port 24 and second port 26, such that an airflow A travels through packed bed 12. A path of airflow A is defined such that airflow A may enter first port 24, flow through the pathways defined within packed bed 12, and exit through second port 26. Airflow A may travel in various directions through packed bed 12, including in the x-direction, y-direction, and z-directions in relation to the provided xyz axis.

Packed bed 12 may contain a sorbent material 16, which may be configured to adsorb and desorb $CO_2$ and/or water. Sorbent material 16 may comprise solid $CO_2$ sorbents such as soda lime, zeolites, molecular sieves, solid oxides, alkali metal carbonates, alkali metal hydroxides, amines, and/or combinations thereof. In various embodiments, frame 20 further defines a fill port 28, which may be used during assembly to dispose sorbent material 16 within packed bed 12. For example sorbent material 16 may be injected into packed bed 12 through fill port 28. Fill port 28 may be subsequently sealed during operation of the heat exchanger.

Referring to FIG. 1B, a packed bed assembly 10 may comprise a packed bed 12 disposed within frame 20. Packed bed 12 may include a plurality of layers configured to facilitate airflow through packed bed 12 and to facilitate conduction of heat between first surface 44 and second surface 46 of packed bed assembly 10. Packed bed 12 may include interposed layers of fin layers 30 and perforated sheets 32. Fin layers 30 may be configured to provide a high surface area to volume ratio for optimized airflow and minimal differential pressures within packed bed assembly 10. Perforated sheets 32 may be configured to couple adjacent fin layers 30 and to permit airflow through the perforations to allow airflow to move between fin layers 30. Sorbent material 16 may be disposed within a volume defined by at least one of fin layers 30.

Fin layers 30 and perforated sheets 32 of packed bed 12 may further be disposed within an inner frame 34, which may include a screen 36 for containing sorbent material 16 within packed bed 12. One or more partition layers 40, 42 may be disposed over a first surface 44 and a second surface 46 of frame 20. Partition layers 40, 42 may operate as a seal at first surface 44 and second surface 46. Partition layers 40, 42 may be configured to couple to adjacent packed bed assemblies 10 for heat exchange therebetween.

When assembled into frame 20, a packed bed 12 may have a plurality of fin layers 30 coupled by a perforated sheet 32 between the fin layers 30 in an alternating pattern. A size and shape of fin layers 30 and perforated sheets 32 may be configured to according to the size and shape of frame 20. Fin layers 30 may be cut to size by laser cutting, milling, electrochemical machining (ECM), discharge machining (EDM), or other suitable process. Frame 20, fin layers 30, perforated sheets 32, inner frame 34 and partition layers 40, 42 may comprise aluminum, aluminum alloy, steel, or stainless steel, copper or other materials.

Figure 2:
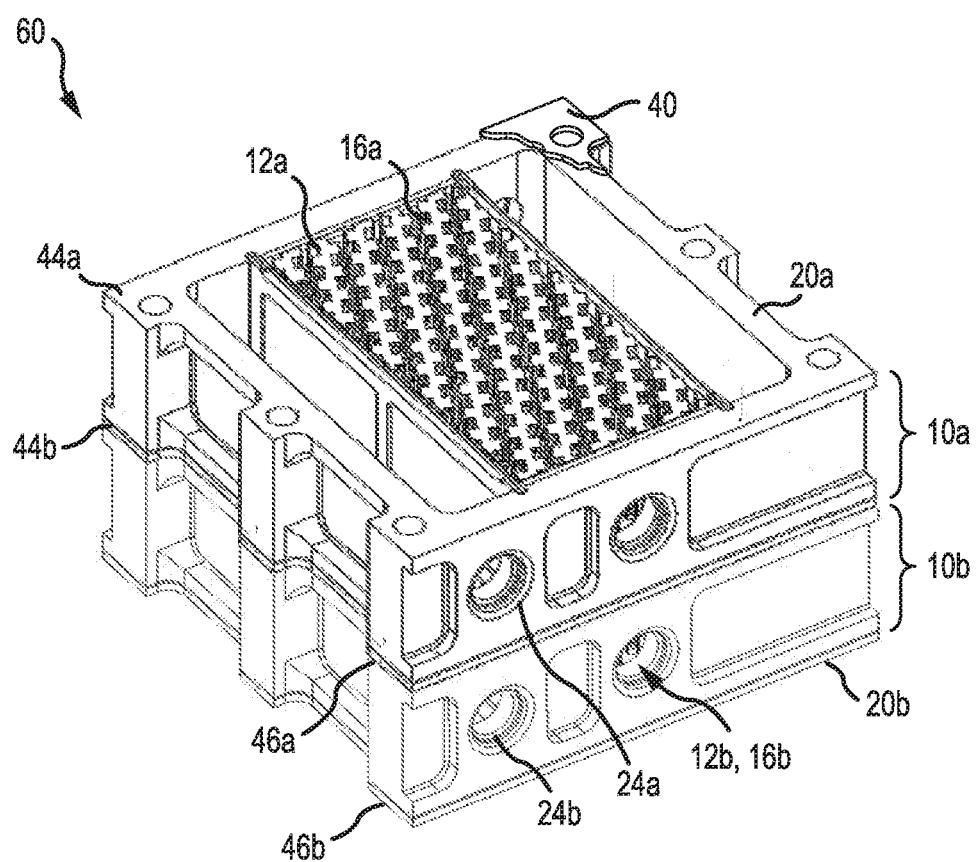
FIG. 2 illustrates a perspective view of a heat exchanger assembly, in accordance with various embodiments.

With reference to FIG. 2, a heat exchanger assembly is shown, in accordance with various embodiments. The packed bed assembly 10 from FIGS. 1A and 1B may be disposed in a heat exchanger assembly 60. A plurality of packed bed assemblies 10a, 10b may be stacked or positioned with adjacent packed bed assemblies abutting one another. A heat exchanger assembly 60 may comprise at least one packed bed, such as first packed bed 12a and/or second packed bed 12b. Heat exchanger assembly 60 may include various quantities of packed bed assemblies 10a, 10b and packed beds 12a, 12b Heat exchanger assembly 60 is illustrated in FIG. 2, for example, with first packed bed assembly 10a stacked over a second packed bed assembly 10b, and with a second surface 46a of first packed bed assembly 10a in contact with a first surface 44b of second packed bed assembly 10b. Thus, a first packed bed 12a may be thermally coupled to a second packed bed 12b. Second packed bed assembly 10b may be in thermal communication with the first packed bed assembly 10A such that heat exchanger assembly 60 may operate isothermally. First packed bed 12a and second packed bed 12b may be thermally coupled by direct physical contact or indirect physical contact.

In various embodiments, the first sorbent material 16a disposed within first packed bed 12a and the second sorbent material 16b disposed within second packed bed 12b may be configured to adsorb and desorb $CO_2$. During operation of heat exchanger assembly 60, one of packed beds 12a, 12b may be adsorbing $CO_2$ and water, while another of packed beds 12a, 12b may be desorbing CO₂ and water. For ease of discussion, heat exchanger assembly 60 will be discussed in terms of first packed bed 12a adsorbing CO₂ (filtering) and second packed bed 12b desorbing CO₂ (regenerating). However, it should be noted that first packed bed 12a and second packed bed 12b may each alternate between filtration and regeneration operating stages.

Heat generated exothermically by adsorption of carbon dioxide by the first sorbent material 16a may be transferred to the second packed bed 12b. The second packed bed 12b may receive heat from the first packed bed 12a to provide energy for CO₂ desorption by second sorbent material 16b. By transferring heat between first packed bed 12a and second packed bed 12b, heat exchanger assembly 60 may be substantially isothermal. Once first sorbent material 16a of first packed bed 12a is saturated with CO₂, the operation of first packed bed 12a and second packed bed 12b is reversed and second packed bed 12b begins adsorbing CO₂ and water, while first packed bed 12a begins regenerating.

Figure 3:
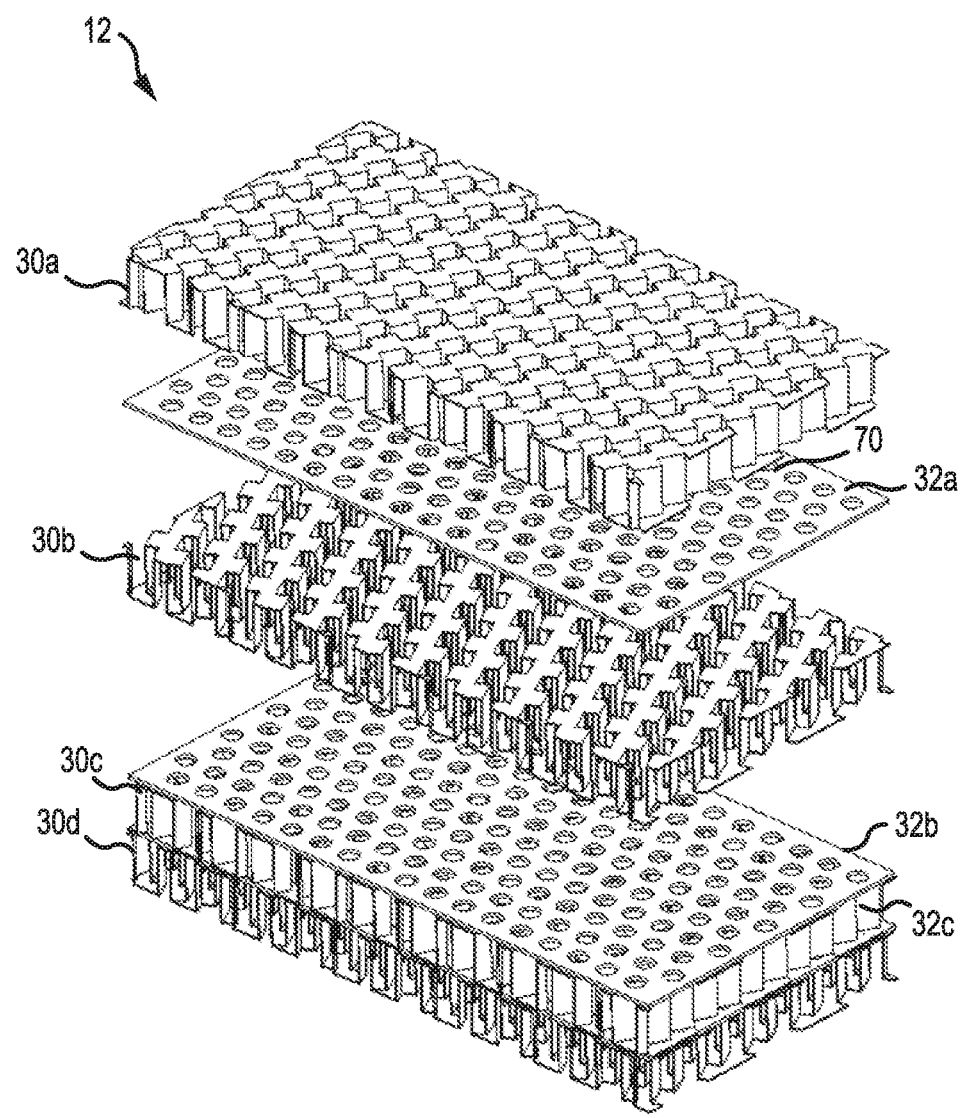
FIG. 3 illustrates an exploded view of a packed bed for a heat exchanger, in accordance with various embodiments.

Referring to FIG. 3, a packed bed for a heat exchanger is shown in accordance with various embodiments. Packed bed 12 may include one or more fin layers 30a, 30b, 30c, 30d separated by one or more perforated sheets 32a, 32b, 32c. Each of fin layers 30a, 30b, 30c, 30d and perforated sheets 32a, 32b, 32c may be configured to conduct heat and may be in thermal communication with the adjacent layers. Each of fin layers 30a, 30b, 30c, 30d and perforated sheets 32a, 32b, 32c may comprise aluminum, aluminum alloy, steel, or stainless steel, copper or other materials. Each of perforated sheets 32a, 32b, 32c may define a plurality of apertures or perforations 70. Perforations 70 may permit airflow between adjacent fin layers 30a, 30b, 30c, 30d.

A first perforated sheet 32a may be disposed between a first fin layer 30a and a second fin layer 30b. A second perforated sheet 32b be disposed between second fin layer 30b and a third fin layer 30c. A third perforated sheet 32c be disposed between third fin layer 30c and a fourth fin layer 30d. The layers are coupled together by a process such as brazing, soldering, welding or other suitable process. The sorbent material 16 discussed with respect to FIG. 1A may at least partially fill a volume defined by one or more of fin layers 30a, 30b, 30c, 30d and perforated sheets 32a, 32b, 32c. Thus, packed bed 12 may include at least a first fin layer 30a thermally coupled to a second fin layer 30b by a first perforated sheet 32a therebetween. Sorbent material 16 may be disposed within a volume defined by at least one of the first fin layer 30a or the second fin layer 30b. In various embodiments, fin layers 30a, 30b, 30c, 30d may comprise lanced offset fins, corrugated fins, louvered fins, wavy fins, pin fins, straight fins, or other fin arrangement.

Figure 4:
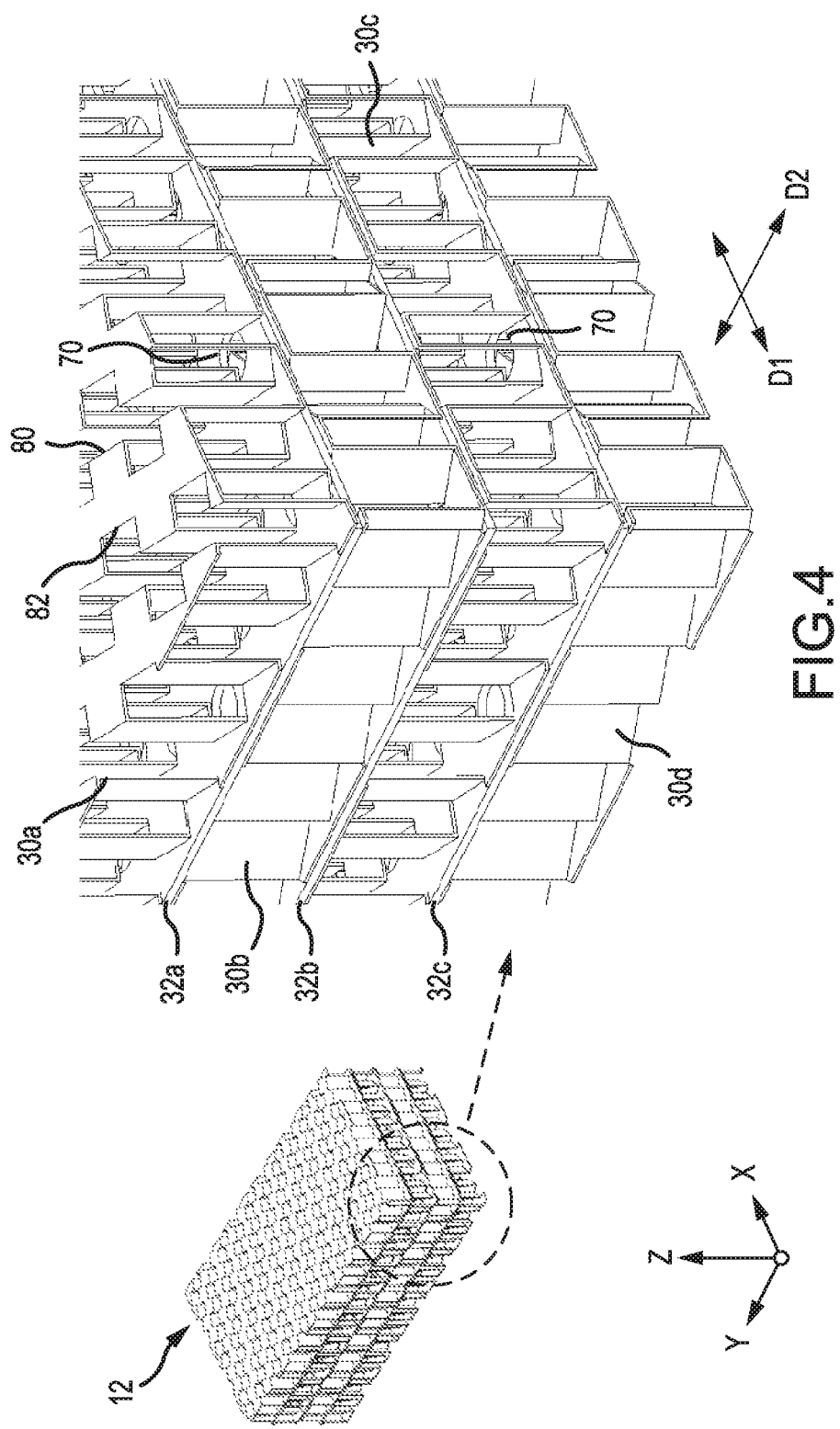
FIG. 4 illustrates a perspective view of a sorbent bed having lanced offset fins, in accordance with various embodiments.

With reference to FIG. 4, a sorbent bed having lanced offset fins is shown in accordance with various embodiments. Fin layers 30a, 30b, 30c, 30d and perforated sheets 32a, 32b, 32c may be configured to permit airflow in multiple directions through packed bed, including in the x-direction, y-direction, and z-directions in relation to the provided xyz axis. In various embodiments, the lances for the fin layers and perforations of the perforated sheets facilitate multi-directional airflow. Fin layers 30a, 30b, 30c, 30d may be disposed within packed bed 12 having alternating orientations. Each fin within a fin layer may have peaks 80 and valleys 82 which may be arranged to allow airflow in various directions including a first direction D1 and a second direction D2, wherein second direction D2 may be substantially perpendicular to the first direction D1. For first fin layer 30a may comprise a plurality of first lanced offset fins oriented with one of its flow paths in the first direction D1, and the second fin layer 30b may comprise a plurality of second lanced offset fins oriented with one of its flow paths in the first direction D2. Thus, first fin layer 30a and second fin layer 30b may be staggered with at least one staggered airflow path. By staggering the lanced offset fins of each adjacent fin layer 30a, 30b, 30c, 30d, airflow may be encouraged in various directions through packed bed 12. The lanced offset fins of fin layer 30a, 30b, 30c, 30d may allow for a compact packed bed 12 and efficient use of the volume of within packed bed 12.

Figure 5:
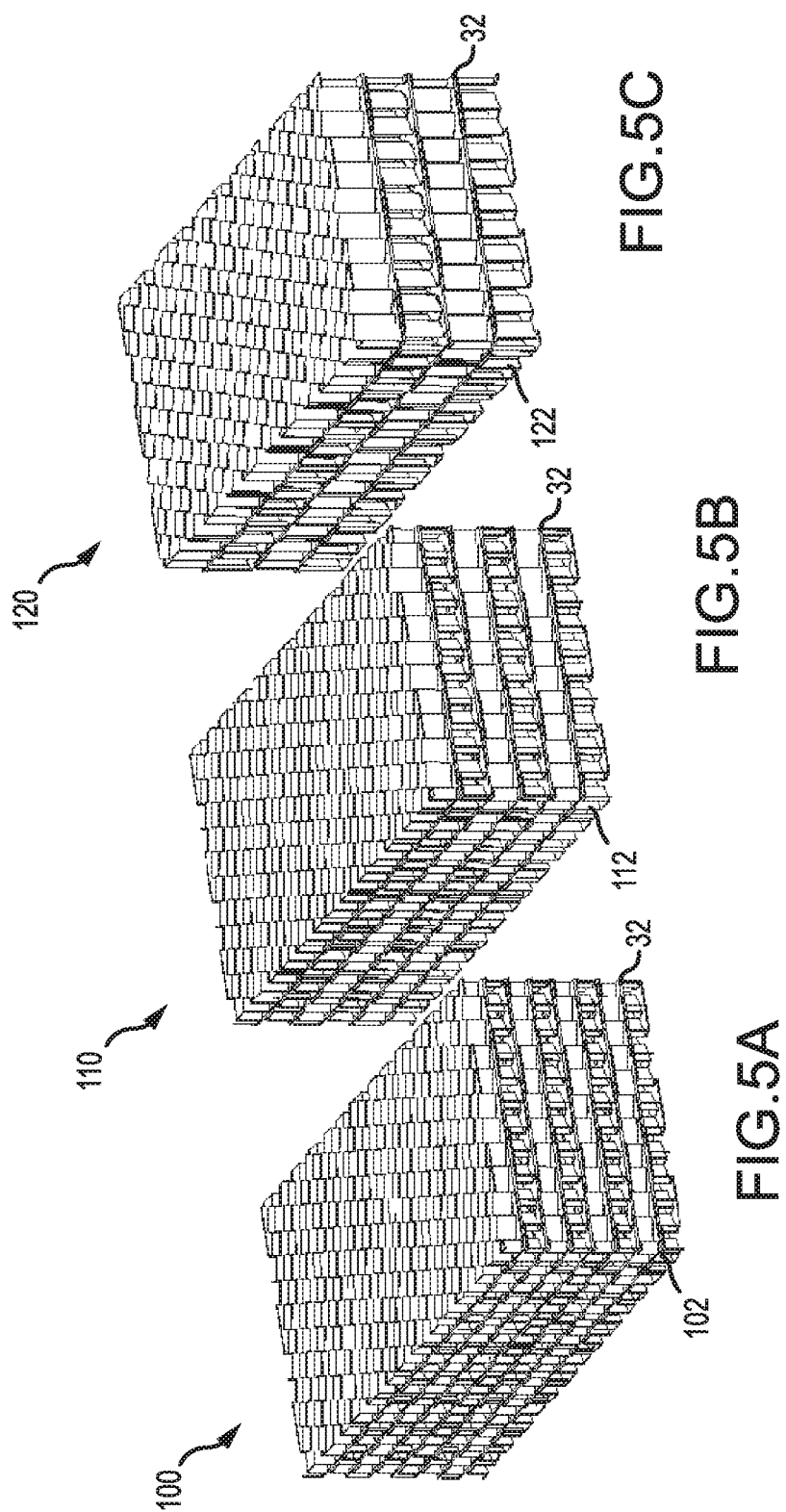
FIGS. 5A, 5B and 5C illustrate sorbent beds for a heat exchanger, in accordance with various embodiments.

With reference to FIGS. 5A, 5B and 5C, various configurations of a packed bed for a heat exchanger are shown, in accordance with various embodiments. A packed bed for a heat exchanger assembly 60 (of FIG. 2) may include various arrangements of fin layers and perforated sheets. The height of packed beds 100, 110, 120 may be configured according to the heat exchanger design. Fin layers 102, 112, 122 further provide structural support for packed beds 100, 110, 120. FIGS. 5A, 5B and 5C show packed beds 100, 110, 120 having different quantities of fin layers 102, 112, 122 and show fin layers 102, 112, 122 having different heights. The height and quantity of fin layers 102, 112, 122 may be selected according to the heat exchanger in which the packed beds 100, 110, 120 are used.

Figure 6:
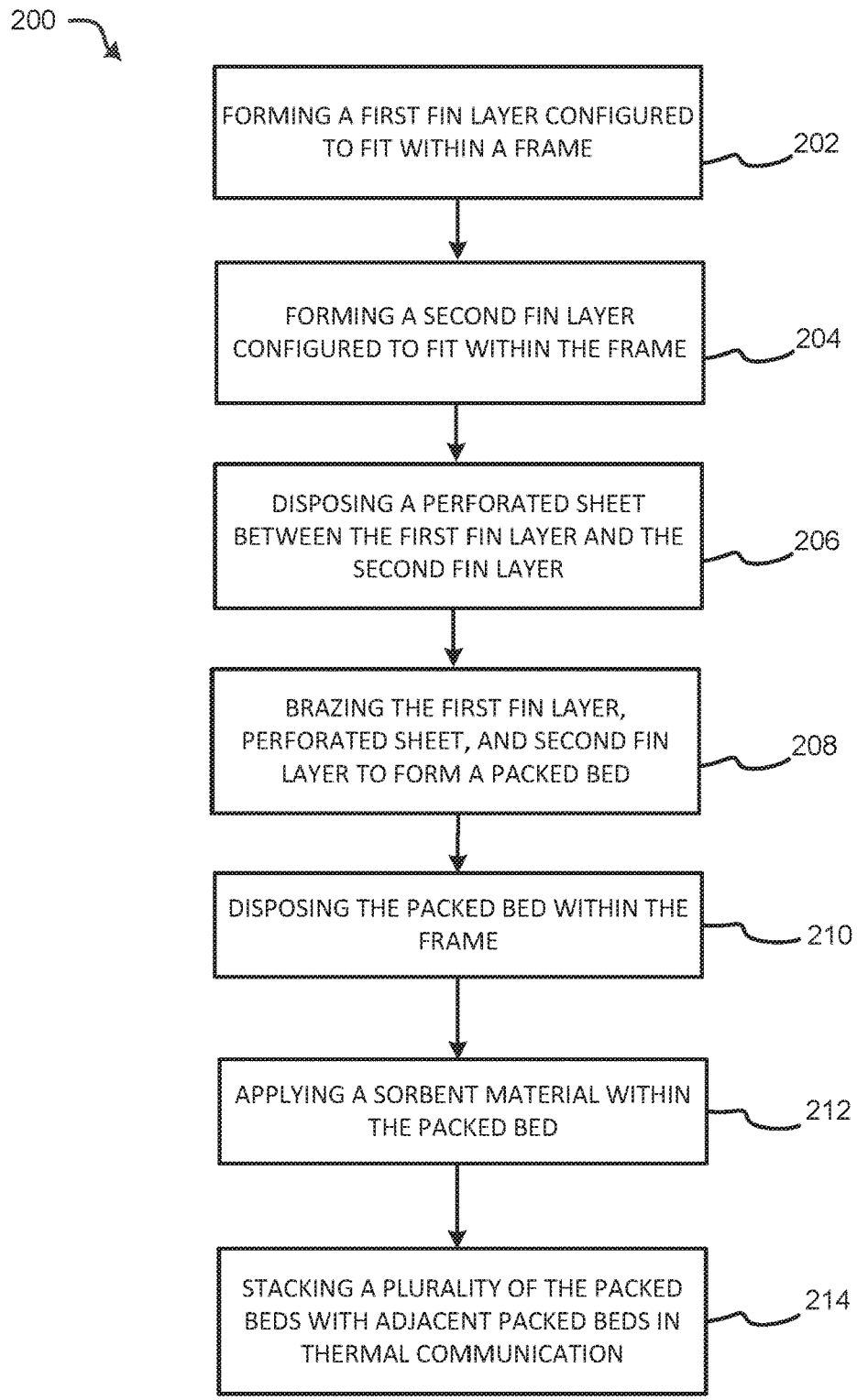
FIG. 6 illustrates a method for manufacturing a heat exchanger assembly, in accordance with various embodiments.

With reference to FIG. 6, a method 200 for manufacturing a packed bed for a heat exchanger, in accordance with various embodiments. The method 200 of manufacturing a packed bed for a heat exchanger may comprise the steps of forming a first fin layer configured to fit within a frame (step 202), forming a second fin layer configured to fit within the frame (step 204), disposing a perforated sheet between the first fin layer and the second fin layer step (206), brazing the first fin layer, perforated sheet, and second fin layer to form a packed bed (step 208), disposing the packed bed within the frame (step 210), applying a sorbent material within the packed bed (step 212), and stacking a plurality of the packed beds with adjacent packed beds in thermal communication (step 214) to form the heat exchanger.

Step 202 may further comprise cutting a first fin layer. The first fin layer may comprise first lanced offset fins. Step 204 may further comprise cutting a second fin layer. The second fin layer may comprise second lanced offset fins. Steps 202 and 204 may further comprise forming the first fin layer and the second fin layer by staggering the first lanced offset fins with the second lanced offset fins. Step 210 may further comprise sealing the packed bed within the frame. The frame may define a fill port. Step 212 may further comprise injecting the sorbent material into the frame through the fill port. The sorbent material may be configured to adsorb carbon dioxide.

Benefits and other advantages have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, and any elements that may cause any benefit or advantage to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

Systems, methods and apparatus are provided herein. In the detailed description herein, references to "various embodiments", "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element is intended to invoke 35 U.S.C. 112(f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A packed bed for a heat exchanger, comprising:
   a frame;
   a first fin layer disposed within the frame and comprising first lanced offset fins;
   a second fin layer disposed within the frame and comprising second lanced offset fins;
   a first perforated sheet disposed between the first fin layer and the second fin layer; and
   a sorbent material disposed within a volume of at least one of the first fin layer or the second fin layer, wherein the first lanced offset fins are staggered with the second lanced offset fins to facilitate multi-directional airflow and allow for a compact configuration of the packed bed.

2. The packed bed of claim 1, wherein the first fin layer is thermally coupled to the second fin layer.

3. The packed bed of claim 1, further comprising:
   a third fin layer disposed within the frame; and
   a second perforated sheet disposed between the second fin layer and the third fin layer.

4. The packed bed of claim 1, wherein the first fin layer, the second fin layer and the first perforated sheet comprise aluminum.

5. The packed bed of claim 1, wherein the sorbent material is configured to adsorb carbon dioxide.

6. The packed bed of claim 1, wherein the first perforated sheet is brazed to the first fin layer and to the second fin layer.

* * * * *